(12) United States Patent
Hu et al.

(10) Patent No.: US 9,063,367 B2
(45) Date of Patent: Jun. 23, 2015

(54) DIRECT-TYPE BACKLIGHT UNIT AND LIQUID CRYSTAL DISPLAY USING THE SAME

(75) Inventors: Che-Chang Hu, Guangdong (CN); Kuang-Yao Chang, Guangdong (CN); Zan-Jia Su, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 202 days.

(21) Appl. No.: 13/811,172

(22) PCT Filed: Aug. 1, 2012

(86) PCT No.: PCT/CN2012/079476
§ 371 (c)(1),
(2), (4) Date: Jan. 18, 2013

(87) PCT Pub. No.: WO2013/189115
PCT Pub. Date: Dec. 27, 2013

(65) Prior Publication Data
US 2013/0335675 A1     Dec. 19, 2013

(30) Foreign Application Priority Data
Jun. 19, 2012   (CN) .......................... 2012 1 0202582

(51) Int. Cl.
*G02F 1/1335*   (2006.01)
*G09F 13/04*    (2006.01)

(52) U.S. Cl.
CPC .......... *G02F 1/133504* (2013.01); *G09F 13/04* (2013.01); *G09F 13/0409* (2013.01); *G02F 1/133603* (2013.01); *G02F 1/133606* (2013.01); *G02F 1/133608* (2013.01)

(58) Field of Classification Search
CPC ..................... G02F 1/133606; G02F 1/133608
USPC ............................................. 349/64
See application file for complete search history.

(56) References Cited

U.S. PATENT DOCUMENTS

| | | | |
|---|---|---|---|
| 2004/0120161 A1* | 6/2004 | Hwang | 362/558 |
| 2007/0047225 A1 | 3/2007 | Sudo | |
| 2007/0242446 A1* | 10/2007 | Lee | 362/29 |
| 2008/0030648 A1* | 2/2008 | Morita et al. | 349/64 |
| 2010/0321610 A1* | 12/2010 | Tanaka et al. | 349/62 |

FOREIGN PATENT DOCUMENTS

| | | |
|---|---|---|
| CN | 102472447 A | 5/2012 |
| JP | 2011-86553 A | 4/2011 |

* cited by examiner

*Primary Examiner* — Thanh-Nhan P Nguyen
(74) *Attorney, Agent, or Firm* — Muncy, Geissler, Olds and Lowe P.C.

(57) ABSTRACT

A direct-type backlight unit is provided for improving a dark area problem on the diffusion plate. The direct-type backlight unit includes an optical sheet; a diffusion plate for supporting the optical sheet; a bottom plate, disposed below the diffusion plate; a plurality of light emitting devices (LEDs), disposed between the diffusion plate and the bottom plate; a plurality of supporting elements, disposed between the diffusion plate and the bottom plate and fixed on the bottom plate, each supporting element including: a top portion having a light transmissive section through which light emitted by the LEDs pass; and a bottom portion, fixed on the bottom plate.

9 Claims, 7 Drawing Sheets

DIRECT-TYPE BACKLIGHT UNIT AND LIQUID CRYSTAL DISPLAY USING THE SAME

FIELD OF THE INVENTION

The present invention relates to a direct-type backlight unit and a liquid crystal display using the same, and more particularly to a support structure which can improve a dark area problem.

BACKGROUND OF THE INVENTION

Recently, a direct-type backlight unit using light emitting diodes (LEDs) is capable of local dimming, has high luminance uniformity and no mercury pollution problem, such that the direct-type backlight unit becomes popular. The direct-type backlight unit can be implemented by two conventional methods. In the first method, a surface mount type LED is adopted, but this method normally requires a large number of LEDs. On the other hand, in the second method, a surface mount type LED and a second lens are used together, which can reduce the number of LEDs used. However, no matter what method is used, it requires a support structure to support the diffusion plate for preventing deformation of the diffusion plate caused by thermal expansion, handling and transportation, which may reduce optical performance and damage LEDs if the height of a cavity accommodating the diffusion plate and the LEDs is low.

Figure 1:
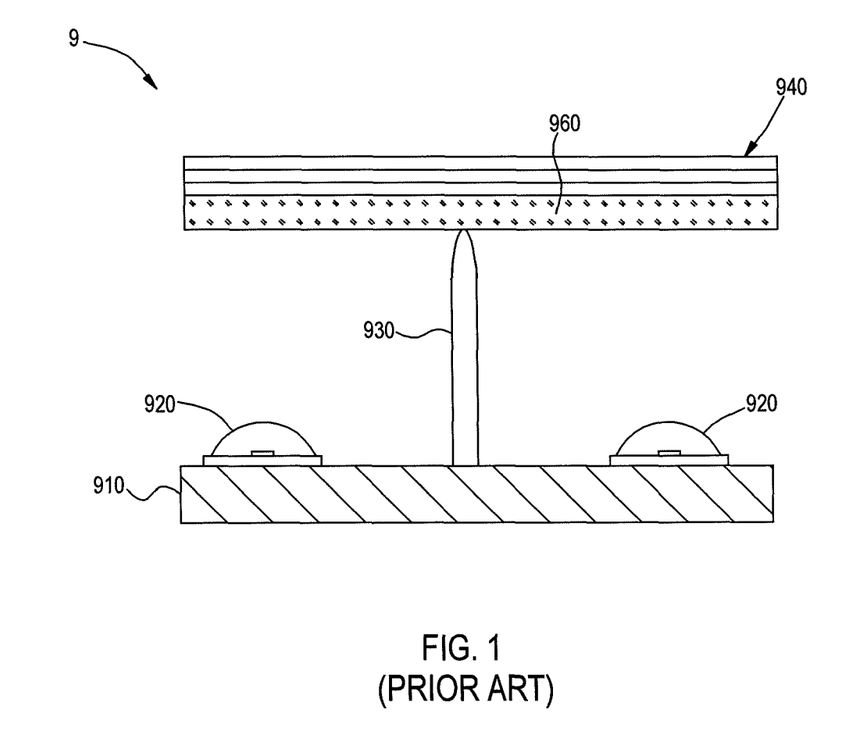
FIG. 1 is a partial structure view of a conventional direct-type backlight unit.

Please refer to FIG. 1, it is a structure view of a conventional direct-type backlight unit. The backlight unit comprises: an optical sheet 940, a diffusion plate 960, a bottom plate 910, a plurality of LEDs, and a plurality of support structures 930. For convenience of explanation, FIG. 1 only shows two LEDs 920 and a support structure 930.

The optical sheet 940 is disposed on the diffusion plate 960; the bottom plate 910 is disposed below the diffusion plate 960; the LEDs 920 are disposed between the diffusion plate 960 and the bottom plate 910; the support structure 930 is disposed between the diffusion plate 960 and the bottom plate 910, and one end of the support structure 930 is fixed on the bottom plate 910 and the other end of the support structure 930 is contacted with the diffusion plate 960.

Figure 3:
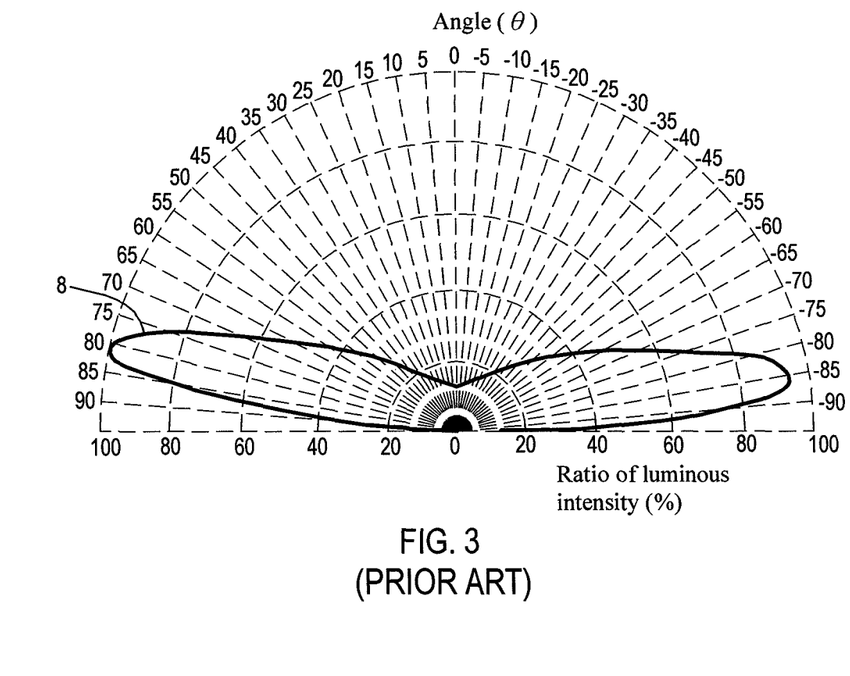
FIG. 3 is a luminous intensity distribution curve of the LED with an additional secondary lens.

Please refer to FIG. 3, it is a luminous intensity distribution curve of the LED 920 with an additional secondary lens. The black line 8 in the FIG. 3 shows an LED having bat-type light field with different luminous intensities in different angles. In addition, from FIG. 3, the light intensity in the two lateral sides is stronger than that of the middle portion in the LED.

Figure 2:
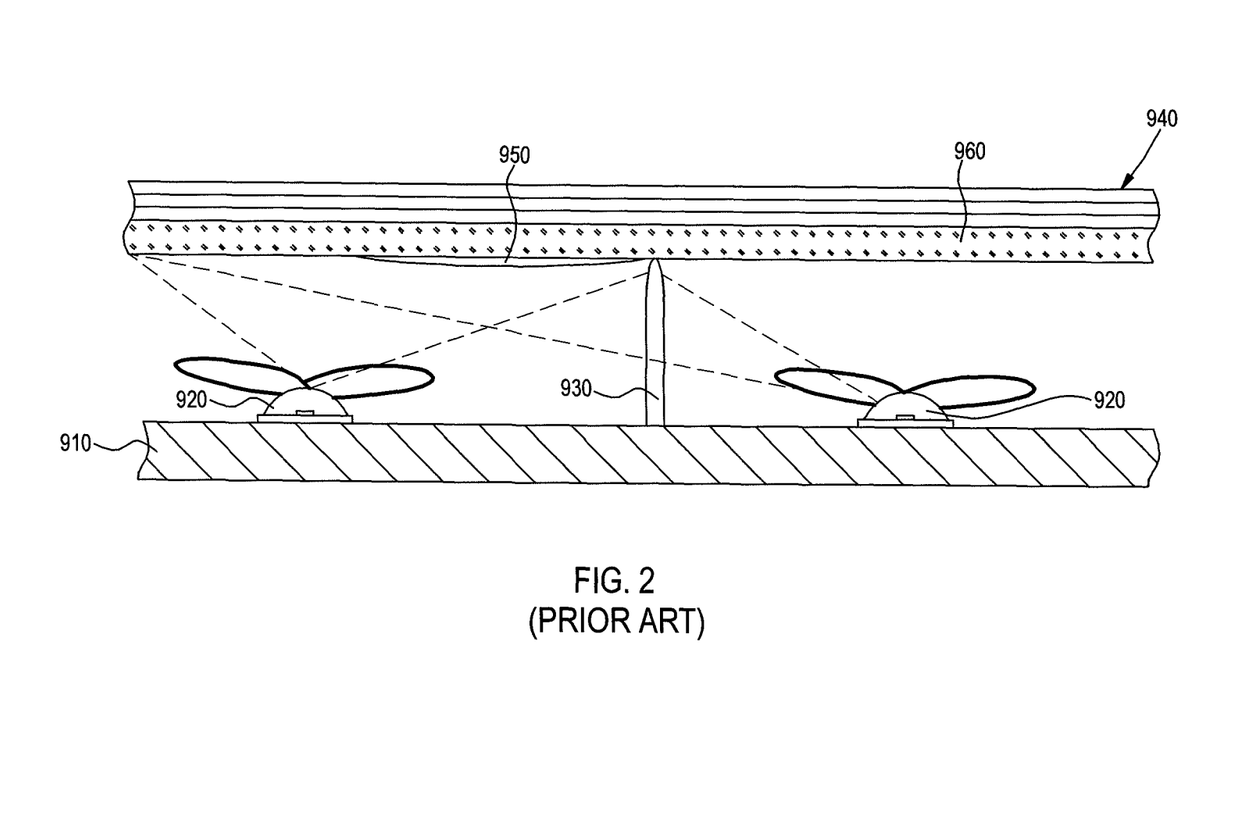
FIG. 2 is a partial structure of a conventional direct-type backlight unit when LEDs emit light.

Please see FIG. 2, when the LEDs 920 emit light, the light is emitted into a bat shape. However, the light is blocked by the support structure 930 and can't pass through, resulting in a dark area 950 on the diffusion plate 960.

Therefore, it is required to provide a novel backlight unit and a crystal display device using the same in order to solve the dark area problem on the diffusion plate.

SUMMARY

In order to overcome the dark area problem on the optical sheet caused by the support structure in the conventional backlight unit, one objective of the present invention is to provide a novel backlight unit which can solve the problem of light blocked by the support structure, resulting in a dark area on the diffusion plate and the downgrade of picture quality.

In order to overcome the dark area on the diffusion plate caused by the support structure of the backlight unit in the conventional liquid crystal display, another objective of the present invention is to provide a novel backlight unit which can solve the problem of light blocked by the support structure, resulting in a dark area on the diffusion plate and the downgrade of picture quality.

To achieve the above-mentioned objectives, the present invention is directed to provide a direct-type backlight unit which comprises an optical sheet; a diffusion plate for supporting the optical sheet; a bottom plate, disposed below the diffusion plate; a plurality of light emitting devices (LEDs), disposed between the diffusion plate and the bottom plate; and a plurality of supporting elements, disposed between the diffusion plate and the bottom plate and fixed on the bottom plate, each supporting element including: a top portion, having a light transmissive section through which light emitted by the LEDs pass; and a bottom portion, fixed on the bottom plate.

In an embodiment, the volume proportion of the light transmissive section in the supporting element is greater than 20% of the total volume of the top portion.

In an embodiment, the top portion of the supporting element is a spiral structure.

In an embodiment, the top portion of the supporting element is a mesh structure.

In an embodiment, the top portion and the bottom portion are integrally formed.

To achieve the above-mentioned objectives, the present invention is directed to provide a liquid crystal display, which comprises a liquid crystal panel; and a direct-type backlight unit for providing light to the liquid crystal panel, including: an optical sheet; a diffusion plate for supporting the optical sheet; a bottom plate, disposed below the diffusion plate; a plurality of light emitting devices (LEDs), disposed between the diffusion plate and the bottom plate; and a plurality of supporting elements, disposed between the diffusion plate and the bottom plate and fixed on the bottom plate, each supporting element including: a top portion, having a top portion body and a light transmissive section through which light emitted by the LEDs pass; and a bottom portion, fixed on the bottom plate.

In an embodiment, a volume proportion of the light transmissive section in the supporting element is greater than 20% of total volume of the top portion.

In an embodiment, the top portion of the supporting element is a spiral structure.

In an embodiment, the top portion of the supporting element is a mesh structure.

In an embodiment, the top portion and the bottom portion are made of the same material and integrally formed.

As a conclusion from the above, the effect of the direct direct-type backlight unit and a liquid crystal display using the same of the present invention lies in that: by using the light transmissive section of the support structure, the light emitted by the LEDs can pass through, so as to improve the dark area problem on the diffusion plate.

The present invention will become more fully understood by reference to the following detailed description thereof when read in conjunction with the attached drawings.

DETAILED DESCRIPTION OF THE EMBODIMENTS

Hereafter, the preferred embodiment of the present invention will be described in detail with reference to the accompanying drawings.

Figure 4:
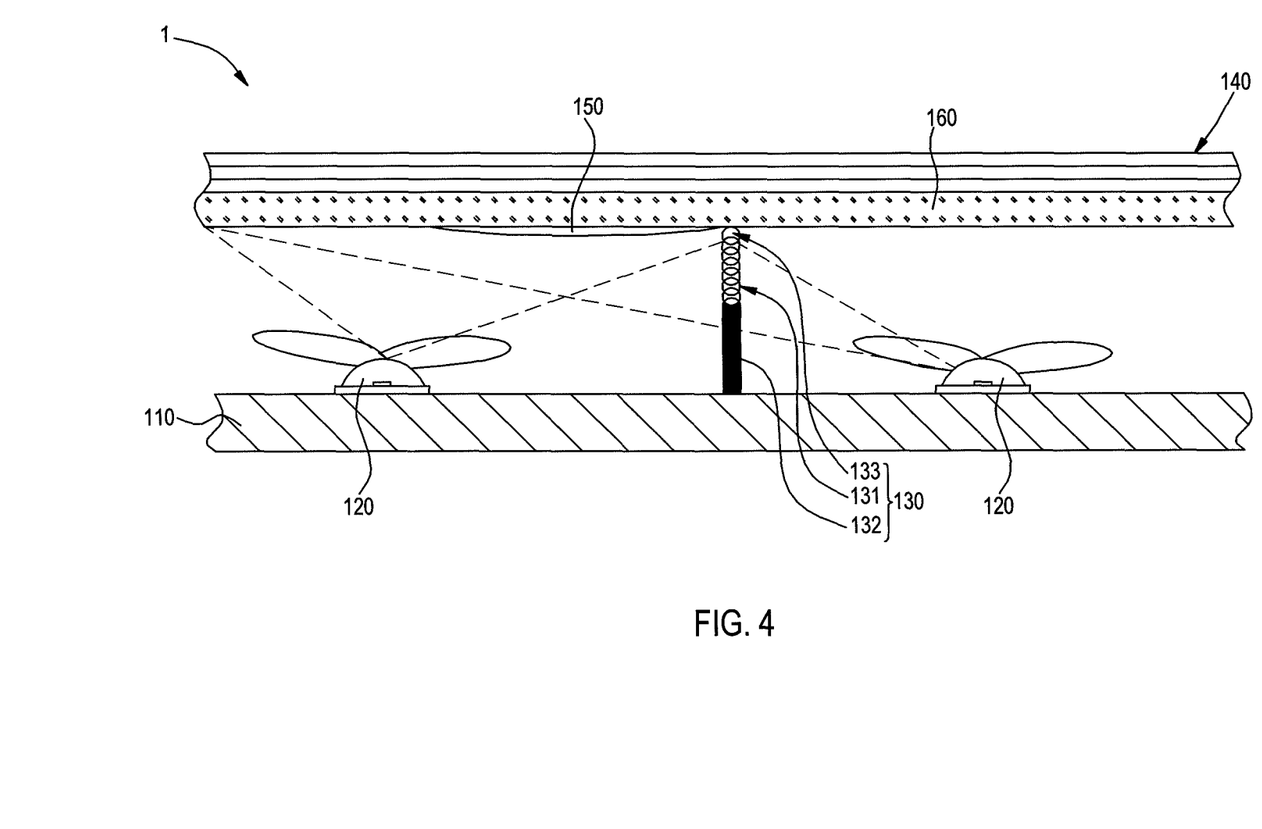
FIG. 4 is a partial cross section view of a direct-type backlight unit according to a first embodiment of the present invention.

FIG. 4 is a partial cross section view of a direct-type backlight unit according to a first embodiment of the present invention. As shown in FIG. 4, the direct-type backlight unit 1 comprises optical sheets 140, a diffusion plate 160, a bottom plate 110, a plurality of LEDs 120, and a plurality of support structures 130. For convenient explanation, in FIG. 4, two LEDs and one support structure 130 are shown. The support structure 130 includes a top portion 131 and a bottom portion 132.

The optical sheets 140 are disposed on the diffusion plate 160; the bottom plate 110 is disposed below the diffusion plate 160; the LEDs 120 are disposed between the diffusion plate 160 and the bottom plate 110, and fixed on the bottom plate 110; the support structure 130 is disposed between the diffusion plate 160 and the bottom plate 110, and the bottom portion 132 of the support structure 130 is fixed on the bottom plate 110. The top portion 131 of the support structure 130 is a spiral structure and has a light transmissive section 133 through which light emitted from the LEDs 120 pass, such that the color of dark area 150 on the diffusion plate 160 become lighter. In addition, the volume ratio of the light transmissive section 133 is greater than 20% of the total volume of the top portion 131.

The optical sheets 140 stacked from bottom to top are a 0 degree prism sheet, a 90 degree prism sheet and a brightness enhancement film, but not limited thereto. The bottom plate 110 may be a reflective sheet in order to increase light use efficiency. The top portion 131 of the support structure 130 may be a spring or a hard material the same as that of the bottom portion 132, such as an acrylic material, a plastic material or a metal material.

Figure 5:
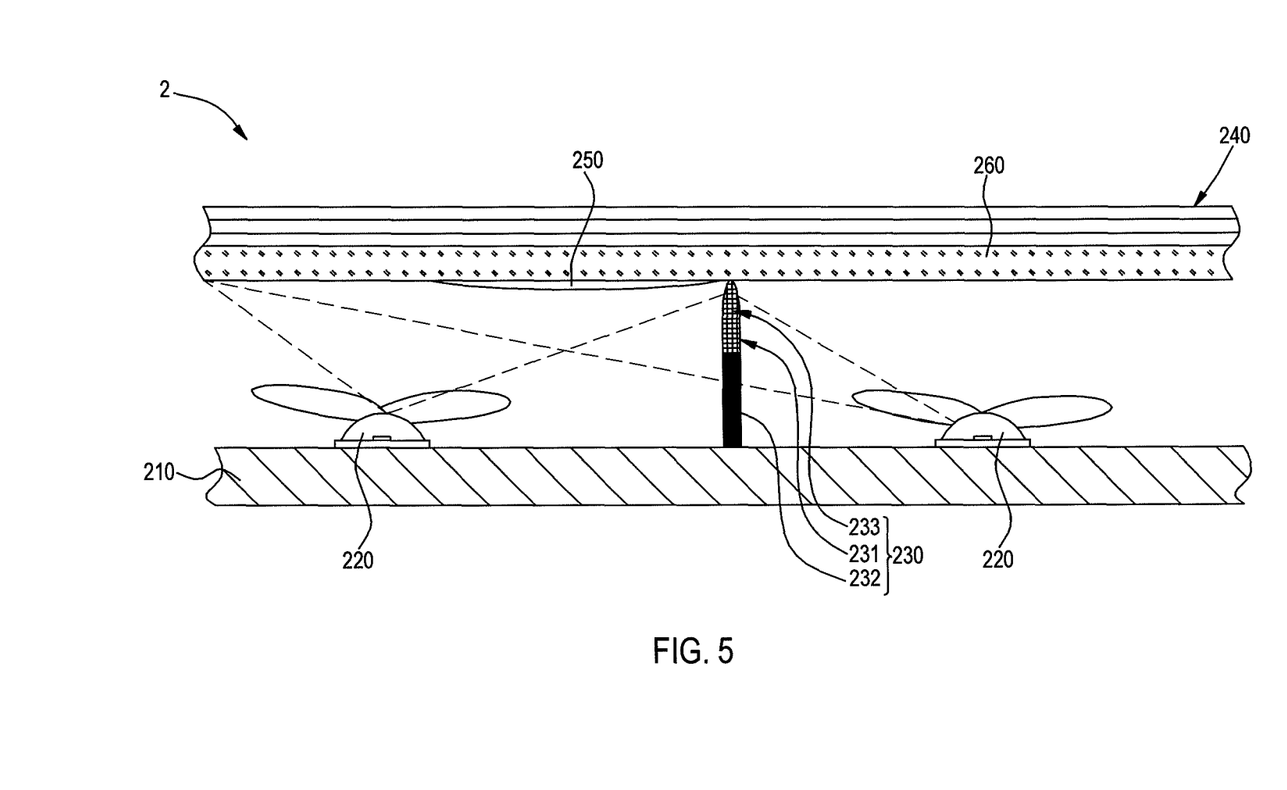
FIG. 5 is a partial cross section view of a direct-type backlight unit according to a second embodiment of the present invention.

FIG. 5 is a partial cross section view of a direct-type backlight unit according to a second embodiment of the present invention. As shown in FIG. 5, the direct-type backlight unit 2 comprises optical sheets 240, a diffusion plate 260, a bottom plate 210, a plurality of LEDs 220, and a plurality of support structures 230. For convenient explanation, in FIG. 5, two LEDs 220 and one support structure 230 are shown. The support structure 230 includes a top portion 231 and a bottom portion 232.

The optical sheets 240 are disposed on the diffusion plate 260; the bottom plate 210 is disposed below the diffusion plate 260; the LEDs 220 are disposed between the diffusion plate 260 and the bottom plate 210, and fixed on the bottom plate 210; the support structure 230 is disposed between the diffusion plate 260 and the bottom plate 210, and the bottom portion 232 of the support structure 230 is fixed on the bottom plate 210. The top portion 231 of the support structure 230 may be a mesh structure and has a light transmissive section 233 through which light emitted from the LEDs 220 pass, such that the color of dark area 250 on the diffusion plate 260 become lighter. In addition, the volume ratio of the light transmissive section 233 is greater than 20% of the total volume of the top portion 231. The optical sheets 240 stacked from bottom to top are a 0 degree prism sheet, a 90 degree prism sheet and a brightness enhancement film, but not limited thereto. The bottom plate 210 may be a reflective sheet in order to increase light use efficiency. The top portion 231 of the support structure 230 may be a hard material the same as that of the bottom portion 232, such as an acrylic material, a plastic material or a metal material.

Figure 6:
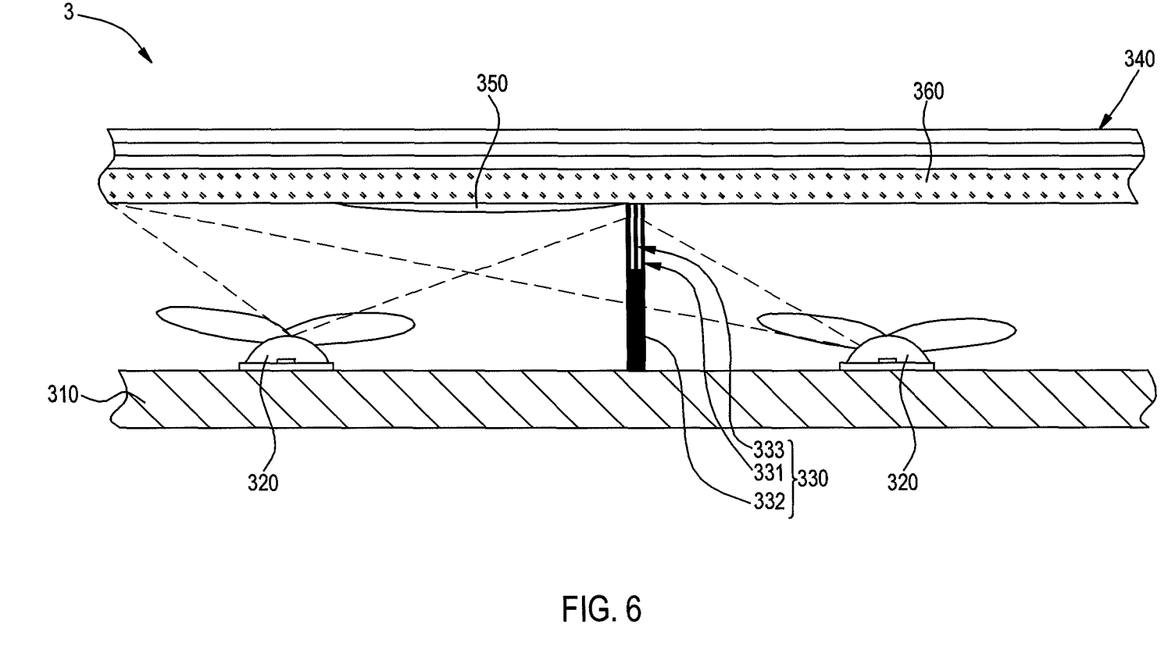
FIG. 6 is a partial cross section view of a direct-type backlight unit according to a third embodiment of the present invention.

FIG. 6 is a partial cross section view of a direct-type backlight unit according to a third embodiment of the present invention. As shown in FIG. 6, the direct-type backlight unit 3 comprises optical sheets 340, a diffusion plate 360, a bottom plate 310, a plurality of LEDs 320, and a plurality of support structure 330. For convenient explanation, in FIG. 6, two LEDs 320 and one support structure 330 are shown. The support structure 330 includes a top portion 331 and a bottom portion 332.

The optical sheets 340 are disposed on the diffusion plate 360; the bottom plate 310 is disposed below the diffusion plate 360; the LEDs 320 are disposed between the diffusion plate 360 and the bottom plate 310, and fixed on the bottom plate 310; the support structure 330 is disposed between the diffusion plate 360 and the bottom portion 332 of the support structure 330 is fixed on the bottom plate 310. The top portion 331 of the support structure 330 may be three columns for supporting the optical sheets 340 and have a light transmissive section 333 in-between, and the light emitted from the LEDs 320 can pass through the light transmissive section 333, such that the color of dark area 350 on the diffusion plate 360 become lighter. In addition, the volume ratio of the light transmissive section 333 is greater than 20% of the total volume of the top portion 331.

The optical sheets 340 stacked from bottom to top are a 0 degree prism sheet, a 90 degree prism sheet and a brightness enhancement film, but not limited thereto. The bottom plate 310 may be a reflective sheet in order to increase light use efficiency. The top portion 331 of the support structure 330 may be a hard material the same as that of the bottom portion 332, such as an acrylic material, a plastic material or a metal material.

Figure 7:
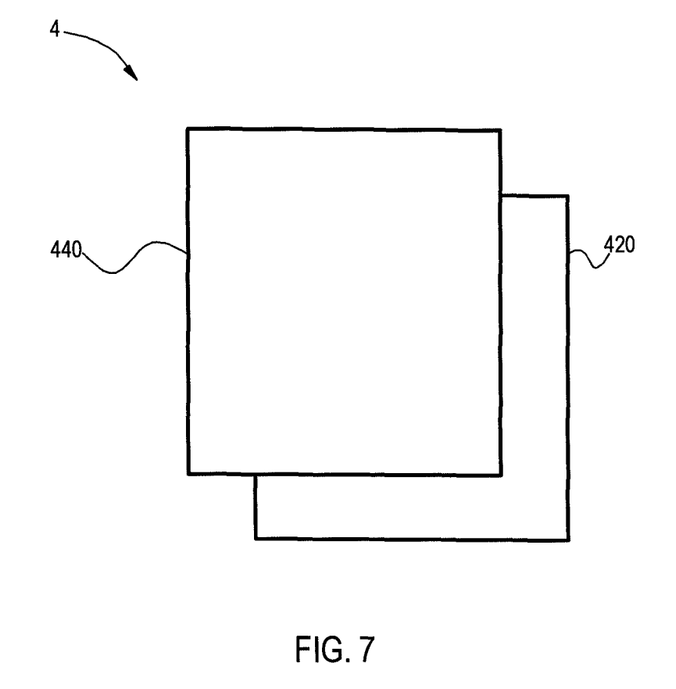
FIG. 7 is a perspective view of a liquid crystal display according to one embodiment of the present invention.

FIG. 7 is a perspective view of a liquid crystal display according to the present invention. The liquid crystal display 4 comprises a liquid crystal panel 440 and a direct-type backlight unit 420. The direct-type backlight unit 420 is used as a light source for providing light to the liquid crystal panel 440 in order to display an image. In one embodiment of the present embodiment, the direct-type backlight unit 420 may be a direct-type backlight unit disclosed in one of the first embodiment, the second embodiment, and the third embodiment. Here, the liquid crystal display 4 further includes a mold frame, a front frame, a back cover, and heatsinks; however, it will not be described herein because the above-mentioned elements and related structures are conventional art.

From the above disclosure, the advantage of the direct-type backlight unit and the liquid crystal display using the same lie in that: by using the light transmissive section of the support structure, the light emitted by the LEDs can pass through, so as to improve the dark area problem on the diffusion plate.

Although the present invention is disclosed through the above embodiments, the embodiments are not intended to limit the present invention. Equivalent replacements like variations and modifications made by any person skilled in the similar art without departing from the spirit and scope of the present invention shall still fall within the protection scope of the present invention.

What is claimed is:

1. A direct-type backlight unit comprising:
   an optical sheet;
   a diffusion plate for supporting the optical sheet;
   a bottom plate, disposed below the diffusion plate;
   a plurality of light emitting devices (LEDs), disposed between the diffusion plate and the bottom plate; and
   a plurality of supporting elements, disposed between the diffusion plate and the bottom plate and fixed on the bottom plate, each supporting element including:
   a top portion, having a light transmissive section through which light emitted by the LEDs pass; and
   a bottom portion, fixed on the bottom plate;
   wherein a volume proportion of the light transmissive section in the supporting element is greater than 20% of total volume of the top portion, the top portion of the supporting element is a spiral structure or a mesh structure, and the top portion and the bottom portion are integrally formed.

2. A direct-type backlight unit comprising:
   an optical sheet;
   a diffusion plate for supporting the optical sheet;
   a bottom plate, disposed below the diffusion plate;
   a plurality of light emitting devices (LEDs), disposed between the diffusion plate and the bottom plate; and
   a plurality of supporting elements, disposed between the diffusion plate and the bottom plate and fixed on the bottom plate, each supporting element including:
   a top portion, having a light transmissive section through which light emitted by the LEDs pass; and
   a bottom portion, fixed on the bottom plate,
   wherein a volume proportion of the light transmissive section in the supporting element is greater than 20% of total volume of the top portion.

3. The direct-type backlight unit as claimed in claim 2, wherein the top portion of the supporting element is a spiral structure.

4. The direct-type backlight unit as claimed in claim 2, wherein the top portion of the supporting element is a mesh structure.

5. The direct-type backlight unit as claimed in claim 2, wherein the top portion and the bottom portion are integrally formed.

6. A liquid crystal display, comprising:
   a liquid crystal panel; and
   a direct-type backlight unit for providing light to the liquid crystal panel, including:
   an optical sheet;
   a diffusion plate for supporting the optical sheet;
   a bottom plate, disposed below the diffusion plate;
   a plurality of light emitting devices (LEDs), disposed between the diffusion plate and the bottom plate; and
   a plurality of supporting elements, disposed between the diffusion plate and the bottom plate and fixed on the bottom plate, each supporting element including:
   a top portion, having a top portion body and a light transmissive section through which light emitted by the LEDs pass; and
   a bottom portion, fixed on the bottom plate,
   wherein a volume proportion of the light transmissive section in the supporting element is greater than 20% of total volume of the top portion.

7. The liquid crystal display as claimed in claim 6, wherein the top portion of the supporting element is a spiral structure.

8. The liquid crystal display as claimed in claim 6, wherein the top portion of the supporting element is a mesh structure.

9. The liquid crystal display as claimed in claim 6, wherein the top portion and the bottom portion are made of a same material and integrally formed.

* * * * *